(12) United States Patent
Teodosiu et al.

(10) Patent No.: US 7,693,958 B2
(45) Date of Patent: Apr. 6, 2010

(54) INSTANT MESSAGING WITH DATA SHARING

(75) Inventors: Dan Teodosiu, Kirkland, WA (US); Peter S. Ford, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 251 days.

(21) Appl. No.: 11/157,187

(22) Filed: Jun. 20, 2005

(65) Prior Publication Data

US 2007/0005707 A1    Jan. 4, 2007

(51) Int. Cl.
G06F 15/16 (2006.01)
G06F 3/00 (2006.01)

(52) U.S. Cl. .................. 709/217; 709/206; 715/751; 715/758

(58) Field of Classification Search .......... None
See application file for complete search history.

(56) References Cited

U.S. PATENT DOCUMENTS

| | | | |
|---|---|---|---|
| 6,584,502 B1 | 6/2003 | Natarajan et al. | |
| 6,662,212 B1 * | 12/2003 | Chandhok et al. | 709/206 |
| 6,912,564 B1 * | 6/2005 | Appelman et al. | 709/204 |
| 6,938,070 B2 * | 8/2005 | Esposito | 709/205 |
| 6,957,077 B2 * | 10/2005 | Dehlin | 455/466 |
| 7,124,123 B1 * | 10/2006 | Roskind et al. | 706/60 |
| 2002/0049786 A1 * | 4/2002 | Bibliowicz et al. | 707/511 |
| 2003/0105819 A1 * | 6/2003 | Kim et al. | 709/205 |
| 2003/0182428 A1 * | 9/2003 | Li et al. | 709/227 |
| 2004/0015569 A1 * | 1/2004 | Lonnfors et al. | 709/220 |
| 2005/0097440 A1 * | 5/2005 | Lusk et al. | 715/500.1 |
| 2009/0138808 A1 * | 5/2009 | Moromisato et al. | 715/758 |

\* cited by examiner

*Primary Examiner*—Patrice Winder
*Assistant Examiner*—Azizul Choudhury
(74) *Attorney, Agent, or Firm*—Lee & Hayes, PLLC

(57) ABSTRACT

Instant messaging with data sharing is described. One or more of the described techniques may be employed to share data in conjunction with an instant messaging session, even if one or more clients which are to share the data are not currently available.

20 Claims, 10 Drawing Sheets

INSTANT MESSAGING WITH DATA SHARING

BACKGROUND

The prevalence of instant messaging is ever increasing as users are able to communicate instant messages using an ever expanding variety of devices, such as personal computers, wireless phones, media devices, and so on. Instant messaging may be utilized, for instance, to enable two or more users to exchange messages via a network during an instant messaging session. When two users are online at the same time, instant messages may be exchanged in real time between the two users. Thus, the instant messages may be utilized to support a text conversation in a manner that mimics how the two users would participate in a typical spoken conversation.

Typical instant messaging sessions, however, do not provide data sharing techniques that may persist outside of the instant messaging session. For example, sharing data in a typical instant messaging session generally requires that each of the users is online at the same time. Therefore, if a user is not available via the instant messaging session, that user is not provided with data that is shared by the other users that are online. Further, no sharing state is persisted between instant messaging sessions. This may lead to inconsistencies in the data between the users which may be difficult to manually manage, such as to determine which version of the data is current, whether a particular version includes changes from each of the clients, and so on. These inconsistencies may lead to user frustration and consequently a diminished instant messaging experience.

SUMMARY

Instant messaging with data sharing is described. One or more techniques may be employed to enable data to be shared between users in relation to one or more instant messaging sessions, even if the users are not online at the same time. Additionally, these techniques may be employed to synchronize data between particular users such that each of the users has an "up-to-date" copy of the data. Further, these techniques may be utilized to schedule the synchronization of the data based on a variety of considerations.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The same reference numbers are utilized in instances in the discussion to reference like structures and components.

DETAILED DESCRIPTION

Overview

Instant messaging with data sharing is described. Traditional data sharing (e.g., file transfer) during instant messaging may happen only if each of the users which share the data are available concurrently, e.g., logged on to a messaging service, can only be used to transfer one file at a time, and does not persist sharing state between instant messaging sessions. Therefore, the interaction between the users is limited by whether each of the users is currently available and does not allow building up of state across sessions, e.g., a kid's photo album. Accordingly, techniques are described in which instant messaging may incorporate data sharing such that clients may share data regardless of whether each of the clients is currently available.

Two users, for instance, may communicate during an instant messaging session through the use of instant messages. During the session, a first user may specify that a particular data item is to be shared via an instant messaging user interface which is utilized to perform the instant messaging session. For example, the instant messaging session may provide for a "shared space" that may be established during an instant messaging session for any user or group of users specified in a first user's contact list. This shared space may allow the first user to share files and make updates to the files that are visible to all other users in the shared space, even if these other users are not currently online. For instant, a first user may designate a folder representing a shared space as accessible to any other user on the first user's contact list, a particular user on the first user's contact list, a group of users on the first user's contact list, and so on. Then the first user may drag data into that shared space (e.g., the folder) and once online, the contents of that folder are synchronized with similar folders maintained by the other users. Thus, each of the other users is provided with a synchronized version of the data that is not dependent on the other users being concurrently available via an instant messaging session. Further, the other users may also make changes to the data that are synchronized back to the first user. The shared space (e.g., the folders) may be persisted across multiple instant messaging sessions.

In the following discussion, an exemplary environment and user interfaces are first described that is operable to employ techniques to provide instant messaging with data sharing. Exemplary procedures are then described which may be provided by the exemplary environment, as well as in other environments.

Exemplary Environment

Figure 1:
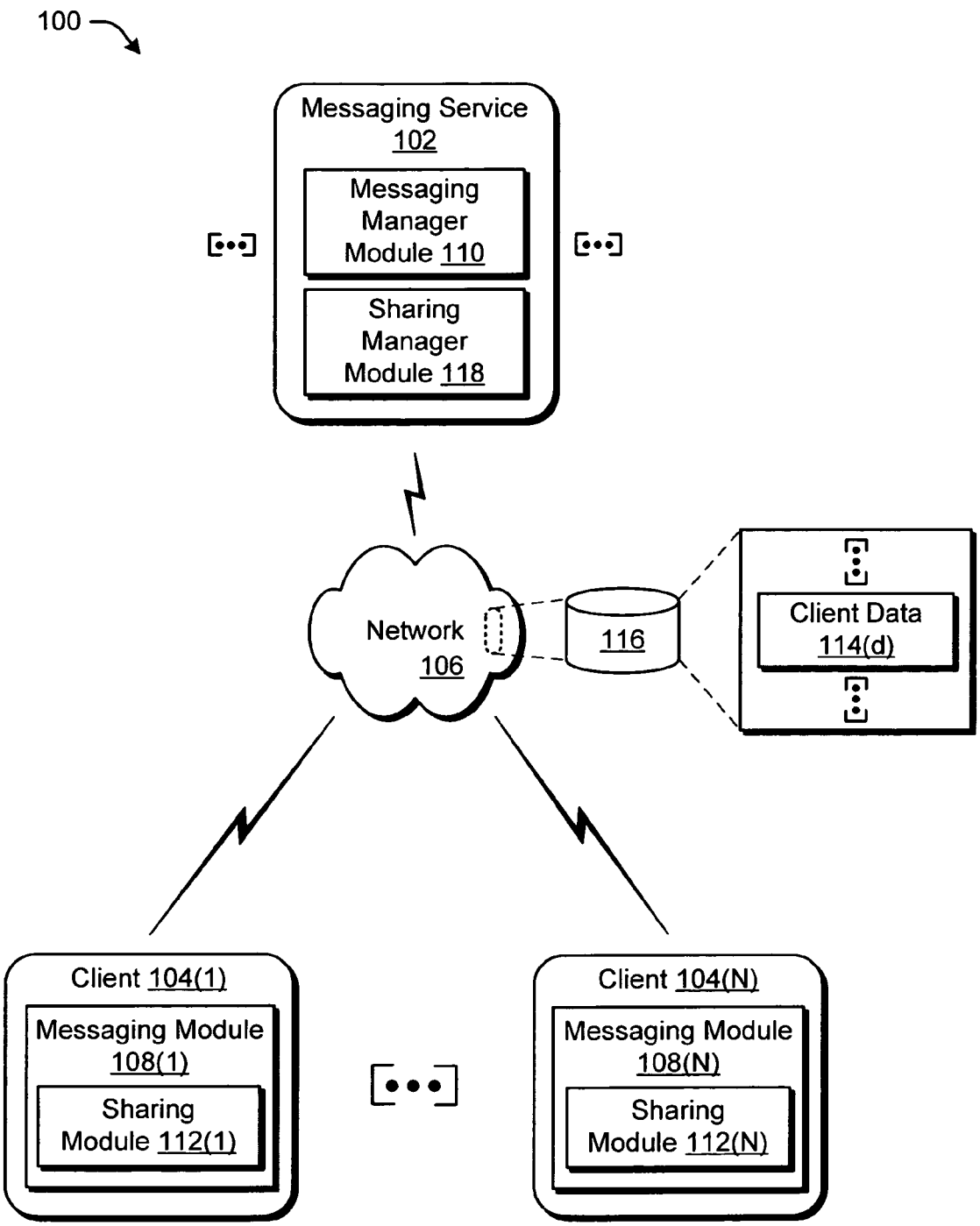
FIG. 1 is an illustration of an environment in an exemplary implementation which is operable to implement instant messaging with data sharing.

FIG. 1 is an illustration of an environment 100 in an exemplary implementation which is operable to implement instant messaging with data sharing. The environment 100 includes a messaging service 102 which is accessible by a plurality of clients 104(1)-104(N) over a network 106. The clients 104 (1)-104(N) may be configured in a variety of ways for accessing the network 106. For example, one or more of the clients 104(1)-104(N) may be configured as a computing device, such as a desktop computer, a mobile station, an entertainment appliance, a set-top box communicatively coupled to a display device, a wireless phone, a game console, and so forth. Thus, the clients 104(1)-104(N) may range from full resource devices with substantial memory and processor resources (e.g., personal computers, game consoles) to low-resource devices with limited memory and/or processing resources (e.g., traditional set-top boxes, hand-held game consoles). The clients 104(1)-104(N) may also relate to a person and/or entity that operate the clients. In other words, one or more of the clients 104(1)-104(N) may describe logical clients that include users, software, and/or devices.

Additionally, although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 106 is shown, the network 106 may be configured to include multiple networks. For instance, client 104(1) may be communicatively coupled via a peer-to-peer network with client 104(N). Each of the clients 104(1), 104(N) may also be communicatively coupled to the messaging service 102 over the Internet. A variety of other instances are also contemplated.

Each of the plurality of clients 104(1)-104(N) is illustrated as including a respective one of a plurality of messaging modules 108(1)-108(N). Each messaging module 108(1)-108 (N) is executable such that a respective client 104(1)-104(N) may communicate its presence information to the messaging service 102 and may participate in an instant messaging session with another one of the clients 104(1)-104(N). Instant messaging provides a mechanism such that each of the clients 104(1)-104(N), when participating in an instant messaging session, may send text messages to each other. The instant messages are typically communicated in real time, although delayed delivery may also be utilized, such as by logging the text messages when one of the clients 104(1)-104(N) is unavailable, e.g., offline. Thus, instant messaging may be thought of as a combination of e-mail and Internet chat in that instant messaging supports message exchange and is designed for two-way live chats. Therefore, instant messaging may be utilized for synchronous communication. For instance, like a voice telephone call, an instant messaging session may be performed in real-time such that each client 104(1)-104(N) may respond to each other client as the instant messages are received.

In an implementation, the messaging modules 108(1)-108 (N) communicate with each other through use of the messaging service 102. Messaging service 102, for instance, may include a messaging manager module 110 that is executable to route instant messages between the messaging modules 108(1)-108(N). For example, client 104(1) may cause the messaging module 108(1) to form an instant message for communication to client 104(N). The messaging module 108 (1) is executed to communicate the instant message to the messaging service 102, which then executes the messaging manager module 110 to route the instant message to the client 104(N) over the network 106. The client 104(N) receives the instant message and executes the messaging module 108(N) to display the instant message.

In another implementation, when the clients 104(1), 104 (N) are communicatively coupled directly, one to another (e.g., via a peer-to-peer network), the instant messages are communicated without utilizing the messaging service 102. Further discussion of the use of a peer-to-peer network by the clients 104(1)-104(N) may be found in relation to FIG. 2.

Each of the clients 104(1)-104(N) is further illustrated as having a respective sharing module 112(1)-112(N). The sharing modules 112(1)-112(N) are executable to share data between the clients 104(1)-104(N) in relation to instant messaging. For example, sharing module 112(1) may be executed to receive data specified for sharing with client 104(N) via an instant messaging user interface and cause the specified data to be stored such that even if client 104(N) is not available (e.g., currently logged-on to the messaging service 102), the client 104(N) may receive the specified data at a later time.

The specified data may be stored in multiple locations and in a variety of ways, which is illustrated in FIG. 1 as client data 114(d) (where "d" can be any integer from one to "D") being stored in storage 116 that is accessible via the network 106, i.e., the client data 114(d) is available via the "cloud". For example, storage 116 may be provided via a peer-to-peer network by the plurality of clients 104(1)-104(N) such that a subset of the clients 104(1)-104(N) includes the data. Therefore, when a previously unavailable client of the plurality becomes available, that client may receive the data from the subset of the clients 104(1)-104(N). In another example, the storage 116 is included as a part of the messaging service 102. For instance, the messaging service 102 may include a sharing manager module 118 that is executable to manage storage of the plurality of client data 114(d), such as to synchronize the client data 114(d), schedule synchronization of the client data, and so on, further discussion of which may be found in relation to FIG. 2.

The storage 116 may also be accessed in a variety of ways. For example, storage 116, and more particularly the client data 114(d) available via storage 116 may be made available via a web-based interface. Changes made through this interface are propagated to corresponding clients and may be subject to conflict-detection and resolution rules. A variety of other examples of storage 116 are also contemplated without departing from the spirit and scope thereof, such as a stand-alone dedicated storage system that is accessible to the messaging service 102 and/or the plurality of clients 104(1)-104 (N).

By providing the client data 114(d) via the "cloud", the data may be shared or accessed even when each of the clients 104(1)-104(N) is not available. The storage 116 provides a shared space which allows the clients 104(1)-104(N) to share the client data 114(d) and make updates to the data that are visible to each other client in the shared space, even if these other clients are not currently online. For instance, client 104(1) may designate a folder as representing a shared space that is accessible to client 104(N). The user of client 104(1) may drag data into that shared space (e.g., the folder) and once client 104(1) is online, the contents of that folder are synchronized with a similar folder maintained by client 104(N), such as via the storage 116 in the "cloud" when client 104(N) is offline. Thus, client 104(N) is provided with a synchronized version of the data that is not dependent on the other clients (e.g., client 104(1)) being concurrently available via an instant messaging session. Additionally, client 104(N) may also make changes to the client data 114(*d*) that are synchronized back to client 104(1) via the storage 116 in the "cloud" when client 104(1) is offline. Further discussion of sharing of client data 114(*d*) may be found in relation to FIGS. 6-10.

Although the exemplary environment 100 is illustrative of an exemplary implementation that is configured to employ instant messaging with data sharing, the exemplary environment may be rearranged in a variety of ways. For example, the sharing manager module 118 and the storage 116 may be provided in a stand-alone system. The sharing manager module 118 and the storage 116 may also be provided by the plurality of clients 104(1)-104(N), such as in an implementation in which instant messaging is performed without utilizing the messaging service 102. For instance, the sharing modules 112(1)-112(N) may incorporate the functionality of the sharing manger module 118 to manage the plurality of client data 114(*d*). Additionally, although illustrated together, the sharing modules 112(1)-112(N) and the messaging modules 108(1)-108(N) may be provided separately and communicate via respective application programming interfaces.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the instant messaging techniques described below are platform-independent, meaning that the instant messaging techniques may be implemented on a variety of commercial computing platforms having a variety of processors.

Figure 2:
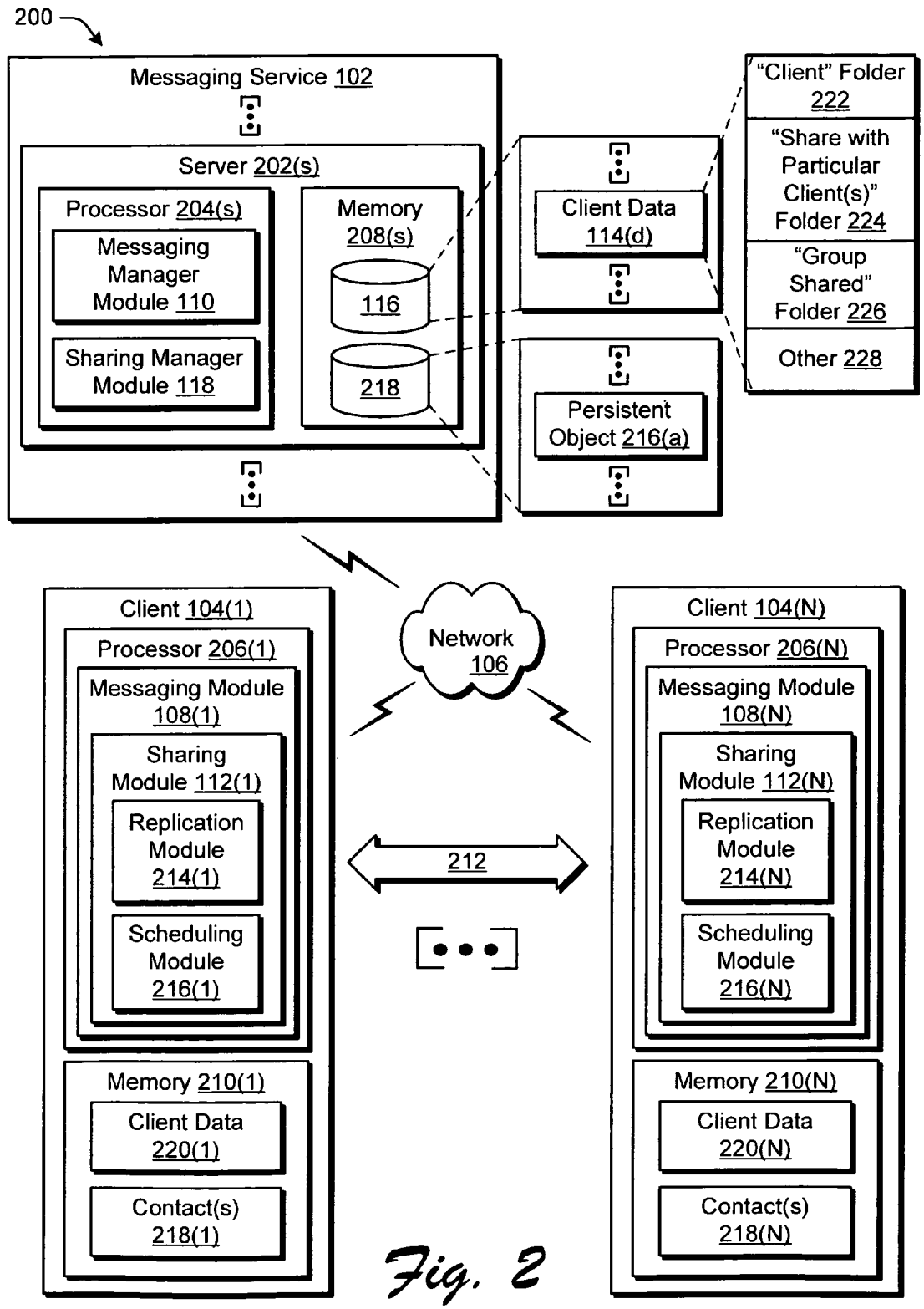
FIG. 2 is an illustration of a system in an exemplary implementation showing a messaging service, a plurality of clients and storage of FIG. 1 in greater detail.

FIG. 2 is an illustration of a system 200 in an exemplary implementation showing the messaging service 102, the plurality of clients 104(1)-104(N) and storage 116 of FIG. 1 in greater detail. The messaging service 102 is illustrated as being implemented by a plurality of servers 202(*s*), where "s" can be any integer from one to "S". The plurality of clients 104(1)-104(N) in FIG. 2 are illustrated as client devices. For example, the plurality of servers 202(*s*) and the clients 104(1)-104(N) are illustrated as including a respective processor 204(*s*), 206(1)-206(N) and respective memory 208(*s*), 210(1)-210(N).

Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 208(*s*), 210(1)-210(N) is shown for the respective servers 202(*s*) and clients 104(1)-104(N), a wide variety of types and combinations of memory may be employed, such as random access memory (RAM), hard disk memory, removable medium memory, and so forth.

Each of the plurality of clients 104(1)-104(N) includes a respective one of a plurality of messaging modules 108(1)-108(N) which is illustrated as being executed on a respective processor 206(1)-206(N) and is storable in a respective memory 210(1)-210(N). As previously stated, the messaging modules 108(1)-108(N) are executable to provide an instant messaging session, either in indirect communication through use of the messaging service 102 over the network 106 and/or in direct communication over a peer-to-peer network 212, which is illustrated in FIG. 2 by a double-headed arrow to indicate that the peer-to-peer network 212 may be provided separately from or as an overlay to network 106.

The messaging modules 108(1)-108(N) may be configured in a variety of ways to provide instant messaging. For example, the messaging modules 108(1)-108(N) may be configured as dedicated modules that are executable to provide instant messaging themselves, such as over a peer-to-peer network overlay as previously described, via the messaging service 102, and so on. In another example, the messaging modules 108(1)-108(N) are configured as communication modules (e.g., ActiveX or similar controls executing inside of web browsers) which are executable to access the messaging service 102 configured as a web site that provides instant messaging. In other words, the controls executing inside of web browsers are configured to provide the functionality of the messaging modules 108(1)-108(N) through interaction with a web site. In such an example, the storage 116 may be configured for access via a web interface such that the web browsers may share data between clients through storage of the client data 114(*d*) as previously described.

The plurality of messaging modules 108(1)-108(N) may be provided to the plurality of clients 104(1)-104(N) in a variety of ways. In an implementation, the messaging modules 108(1)-108(N) are provided by the messaging service 102 (and more particularly through execution of the messaging manager module 110) in response to a request to initiate an instant messaging session. For example, client 104(1) may request initiation of an instant messaging session with client 104(N). If client 104(N) accepts initiation of the instant messaging session, the messaging manager module 110 is executed on processor 204(*s*) to communicate the messaging module over the network 106 for execution on the respective clients 104(1)-104(N) to provide an instant messaging session. In a different implementation, the messaging modules 108(1)-108(N) may be downloaded and installed by the users of clients 104(1)-104(N).

Each of the messaging modules 108(1)-108(N) is illustrated as having a respective one of a plurality of replication modules 214(1)-214(N) and a respective one of a plurality of scheduling modules 216(1)-216(N). The replication modules 214(1)-214(N) are representative of functionality that is responsible for synchronizing data shared by the plurality of clients 104(1)-104(N), such as files and directories. For example, each of the clients 104(1)-104(N) may include a respective list of contacts 218(1)-218(N) that are used to specify how to share data 220(1)-220(N) maintained by the clients 104(1)-104(N) by defining one or more sharing spaces. For example, one of the contacts 218(1) of client 104(1) may reference client 104(N) (e.g., alias, friendly name, network address, and so on) and likewise, one of the contacts 218(N) of client 104(N) may reference client 104(1); using the above contacts, clients 104(1) and 104(N) may establish a sharing space. The replication modules 214(1)-214(N), when executed, may implement peer-to-peer client data 220(1)-220(N) replication such that each of the clients 104(1)-104(N) referenced by the contacts 218(1)-218(N) has a synchronized version of the client data 220(1).

The replication modules 214(1)-214(N), though interaction with the sharing manager module 118 for instance, may synchronize client data 220(1)-220(N) with client data 114(*d*) such that the clients 104(1)-104(N) may make changes to their client data 220(1)-220(N) and have the changes become synchronized with client data 114(*d*) and visible to each other client that is sharing the data without explicit actions being required by the clients. In other words, the synchronizing may be performed by the modules automatically and without user intervention. Further, through use of storage 116 of the client data 114(*d*), the change may be made and propagated even if each of the clients 104(1)-104(N) is not currently available, e.g., logged on to the messaging service 102, logged on to a peer-to-peer instant messaging session performed by the plurality of clients 104(1)-104(N) without use of the messaging service 102, and so on. In an implementation, the changed data and not the entire data item (e.g., a modified subset of file) is replicated to conserve hardware, software and network resources, although replication of the entire data item (e.g. files and directories) may also be contemplated. For example, the client data 114(*d*) may describe the modified subset of the file which is communicated using a "store-and-forward" technique to each of the clients that share the client data 114(*d*). This allows space in storage 116 to be reclaimed. For instance, in the case of a partial copy, the storage 116 may keep information about a directory structure and file metadata, but not data for each file being shared; in that case, only data for the files that have not yet been replicated to the plurality of clients 104(1)-104(N) may be kept in storage 116. Once the files have been replicated to the plurality of clients 104(1)-104(N), the space in storage 116 may be reclaimed automatically.

The replication modules 214(1)-214(N) and/or the sharing manager module 118 may also manage synchronization of the client data 220(1)-220(N) and 114(*d*) to detect and flag conflicting changes. The modules may then notify the clients 104(1)-104(N) of the conflict for correction, such as to determine which changes should be kept, deleted, and so on. A variety of other functionality may be provided by the replication modules 214(1)-214(N), further discussion of which may be found in relation to FIGS. 6-7 and 9-10.

The scheduling modules 216(1)-216(N) are representative of functionality that is configured to schedule synchronization performed by the respective replication modules 214(1)-214(N). For example, the scheduling modules 216(1)-216(N) may control replication activity in order to manage resources used to perform the synchronization, such as processing resources (e.g., CPU cycles), memory resources (e.g., amount of memory used, how often the memory is accessed, and so on), network resources (e.g., bandwidth utilized), and so on. Additionally, the scheduling modules 216(1)-216(N) may schedule synchronization based on a wide variety of other considerations, further discussion of which may be found in relation to FIG. 8.

The shared space provided for sharing the client data 220 (1)-220(N) and 114(*d*) between the plurality of clients 104 (1)-104(N) may be configured in a variety of ways. For example, each of the clients 104(1)-104(N) may have a "client" folder 222, one or more "share with particular client(s)" folders 224, a "group" shared folder 226, and other 228 representations of storage for shared data items. One or more copies of these folders may also be maintained as client data 114(*d*) in storage 116. The client folder 222, for instance, may correspond to a particular one of the clients 104(1)-104(N) and contain data that is replicated to each other client having a copy of the client folder. In an implementation, the other clients will receive any client data (e.g., files, folders, etc.) that the client drops into that folder, but will not be able to change or modify that data. In a different implementation, all clients are able to change or modify the data.

A "share with particular client(s)" folder 224 may be provided for each contact included in the list of contacts 218(1)-218(N) of the respective clients 104(1)-104(N). This folder may be utilized for collaboration with other contacts, such as by permitting changes to be made to data items in this folder by each user having access to the folder, e.g., a locally stored version of the folder that is synchronized with another locally stored version on the other client or with the client data 114(*d*) in storage 116. The "group shared" folder 226 may also be provided for collaboration.

Both the "share with particular client(s)" folder 224 and the "group shared" folder 226 may utilize a notion of groups that is persisted. For example, persistence of a group (e.g., a group of two in the instance of the "share with particular client(s) folder 224, two or more as in the "group shared" folder 226) may be provided through the use of a plurality of persistent objects 216(*a*) (where "a" can be any integer from one to "A") that specify membership in a particular group. For example, each persistent object 216(*a*) may contain references to a collection of clients that are permitted to participate in a group. Each participant in the group may therefore have a corresponding folder (e.g., a "share with particular client(s)" folder 224 or a "group shared" folder 226) which contains data that is shared by members of the group, such as to permit group collaboration. Further, one or more copies of the "group shared" folder may also be maintained as client data 114(*d*) in storage 116. The persistent objects 216(*a*) are illustrated as stored in storage 218 included in memory 208(*s*) and local copies 218(1)-218(N), although the storage 218 may be provided in a variety of different ways.

Each of the plurality of persistent objects 216(*a*) is persistent such that it continues to exist beyond termination of execution of a module that created the persistent object and/or continues to exist past a session, during which, the persistent object was created. For example, the messaging module 108 (1) may be executed on the client 104(1) to form and store the persistent object 216(*a*). Therefore, even if execution of the messaging module 108(1) is terminated, the persistent object 216(*a*) may be called the next time the clients 104(1)-104(N) "log on". Thus, the persistent objects 216(*a*) may persist past an instant messaging session utilized to create the persistent object 216(*a*), past execution of a module (e.g., messaging module 108(1)) utilized to create the persistent object, and so on.

The persistent object 216(*a*) may also be utilized to provide a variety of other functionality. For example, by providing for persistence of client references in the persistent object 216(*a*), the persistent object 216(*a*) may be reused to invite the clients 104(1)-104(N) to participate in an online activity (e.g., instant messaging, sharing, online games, and so on) without having to perform a plurality of manual steps, such as to select which of clients 104(1)-104(N) are to participate in the online activity, sending notifications that participation in the online activity is desired, and so on. Additionally, the persistent object 216(*a*) may be configured to be callable by or replicated in the contacts 218(1)-218(N) of any one of the referenced clients 104(1)-104(N). For instance, client 104(N) may leverage the persistent object 216(*a*) which was created by client 104(1). Further, each client that is referenced by the persistent object 216(*a*) may be permitted to change the persistent object 216 (*a*) to include a reference of another client, thereby increasing membership of the group described by the persistent object. It should be noted that the persistent objects 216(*a*) may be utilized to specify a sharing relationship and do not require that each of the clients specified therein is online concurrently.

Figure 3:
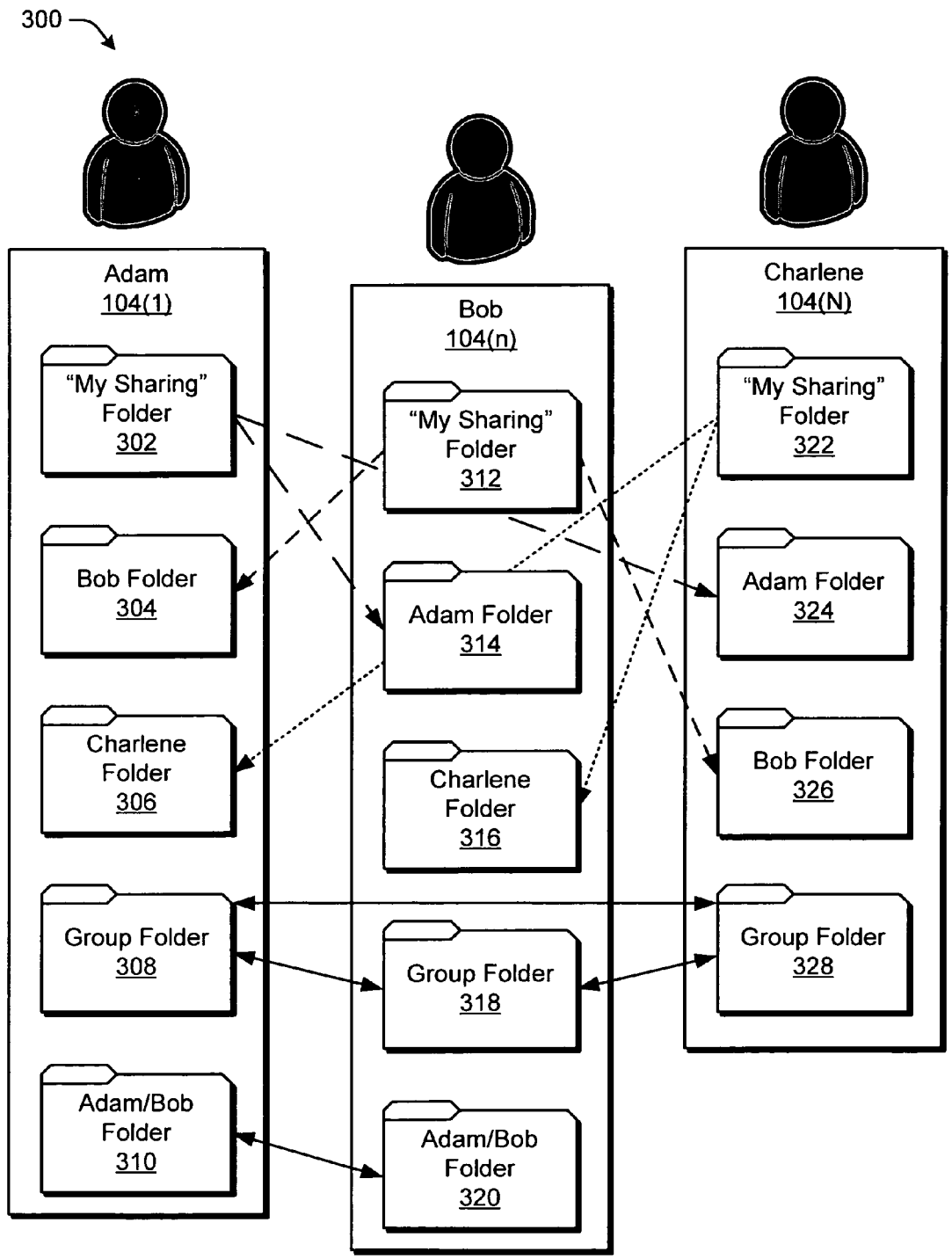
FIG. 3 is an illustration of an exemplary implementation showing a plurality of clients of FIG. 1 as utilizing shared spaces to share client data between the clients in conjunction with instant messaging.

FIG. 3 is an illustration of an exemplary implementation 300 showing a plurality of clients of FIG. 1 as utilizing shared spaces to share client data between the clients in conjunction with instant messaging. Clients 104(1), 104(n) and 104(N) are illustrated as having the names "Adam", "Bob" and "Charlene", respectively, and therefore in the following discussion may be referred to as "client 104(1)" or "Adam 104(1)", "client 104(n)" or "Bob 104(n)", and so on.

Adam 104(1) is illustrated as including a "my sharing" folder 302, a "Bob" folder 304, a "Charlene" folder 306, a "group" folder 308, and an "Adam/Bob" folder 310. Bob 104(n) is illustrated as including a "my sharing" folder 312, an "Adam" folder 314, a "Charlene" folder 316, a "group" folder 318 and an "Adam/Bob" folder 320. Likewise, Charlene 104(N) includes a "my sharing" folder 322, an "Adam" folder 324, a "Bob" folder 326 and a "group" folder 328.

The "my sharing" folders 302, 312, 322 operate to share data placed in these folders with corresponding folders 304, 306, 314, 316, 324, 326 on the other clients. For example, the "my sharing" folder 302 of Adam 104(1) corresponds to the "Adam" folders 314, 324 of Bob 104(n) and Charlene 104(N), respectively. Thus, data placed in folder 302 is automatically replicated to folders 314, 324, as illustrated by the dashed line from folder 302 to folders 314, 324. In this way, Bob 104(n) and Charlene 104(N) may readily determine that the data originated from Adam 104(1). Similar functionality may also be employed by the "my sharing" folders 312, 322 of Bob 104(n) and Charlene 104(N), respectively, as illustrated by the corresponding dashed lines.

Since they belong to the same group, Adam 104(1), Bob 104(n) and Charlene 104(N) may also share data through the group folders 308, 318, 328. As previously described, the groups may be formed based on a persistent object 216(a) that specifies group membership. Data changed in these folders 308, 318, 328 may be automatically synchronized between the clients 104(1), 104(n), 104(N).

Folders may also be provided for collaboration between two users. For example, the "Adam/Bob" folder 310, 320 may represent data shared between Adam 104(1) and Bob 104(n) (e.g., a group of two) for collaboration such that either client may add, modify, delete and otherwise change data contained in these folders.

Although shared spaces provided by a variety of folders have been described, shared spaces may be provided in a variety of other ways utilizing a variety of representations without departing from the spirit and scope thereof, such as in conjunction with storage 116, implemented in a messaging service 102. Further, the shared spaces represented by the folders 302-328 may also be configured in a variety of ways, an example of which is shown in the following illustration.

Figure 4:
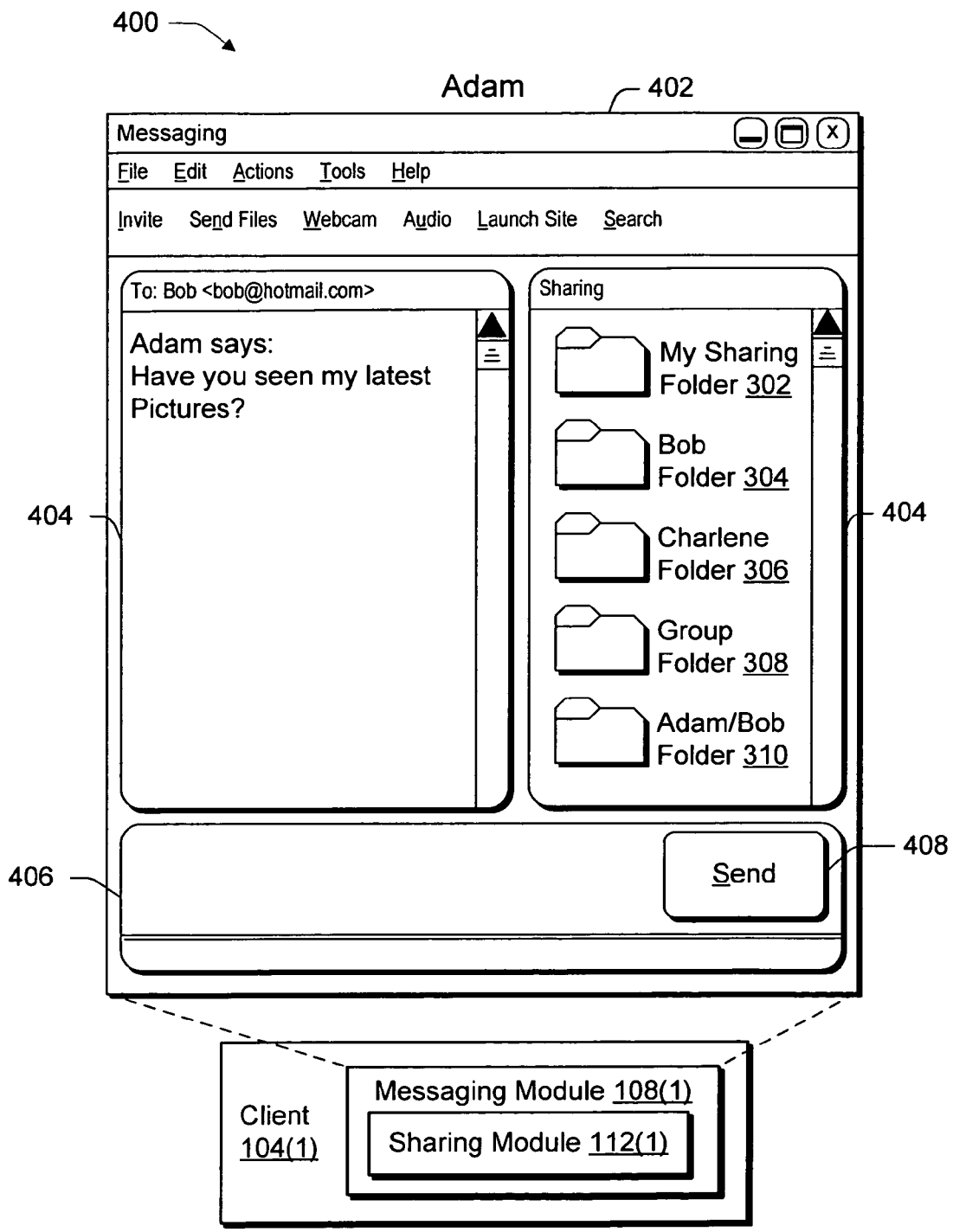
FIG. 4 is an illustration of a user interface in an exemplary implementation that is configured to provide instant messaging and the shared spaces of FIG. 3 to share data with at least one other client.

FIG. 4 is an illustration of a user interface in an exemplary implementation 400 that is configured to provide instant messaging and the shared spaces of FIG. 3 to share data with at least one other client. A user interface 402 is displayed through execution of a messaging module 108(1) on the client 104(1). The user interface 402 includes an instant messaging portion 404 that is configured to display instant messages communicated during an instant messaging session with another client, which in this instance is Bob 104(n) from FIG. 3. To send messages, text may be entered via a text entry portion 406 that includes a representation of a "send" button 408 that, when selected, causes the entered text to be communicated to each client participating in the instant messaging session.

The user interface 402 also includes a sharing portion 410. The sharing portion 410 of the user interface 402 includes a representation of the folders previously described in relation to FIG. 3, which include a "my sharing" folder "Bob" folder 304, a "Charlene" folder 306, a "group" folder 308" and an "Adam/Bob" folder 310. Thus, the user interface 402 may be configured to provide instant messaging and data sharing.

As previously described, the data may be shared even if one or more of the other clients are not currently online, such as Charlene 104(N). For example, data dragged to the group folder 308 may be immediately shared with each client that is currently available (e.g., Bob 104(n)) and stored for later communication to other clients specified by the folder when available, e.g., Charlene 104(N). Further discussion of synchronization of the folders may be found in relation to FIGS. 6-10.

Figure 5:
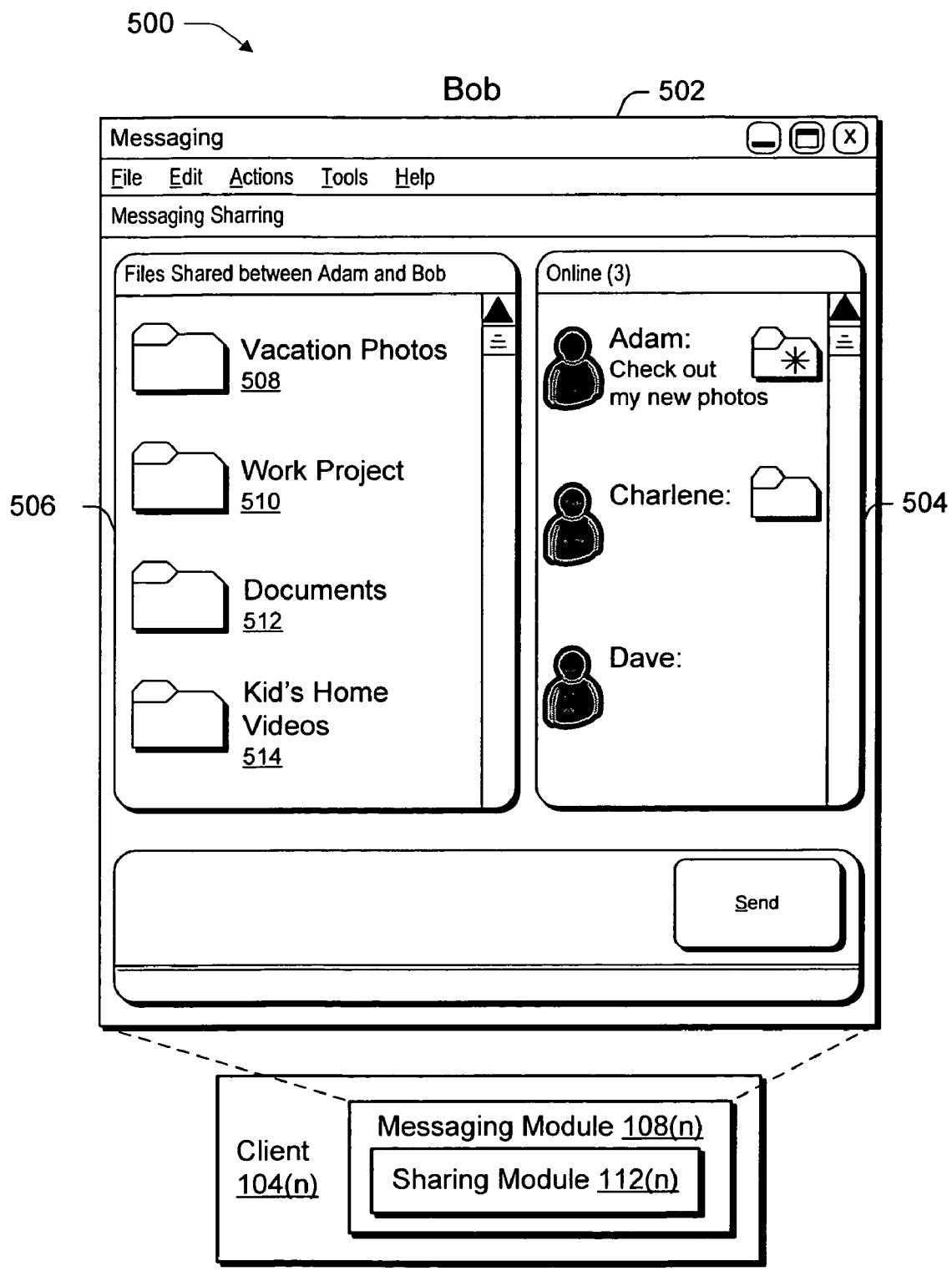
FIG. 5 is an illustration of another user interface in an exemplary implementation that is configured to provide instant messaging and the shared space of FIG. 3 to share data with at least one other client.

FIG. 5 is an illustration of another user interface in an exemplary implementation 500 that is configured to provide instant messaging and the shared space of FIG. 3 to share data with at least one other client. Like FIG. 4, the user interface 502 is displayed through execution of a messaging module 108(n) on the client 104(n). The user interface 502 of FIG. 5 includes a sharing portion 504 including representations of a plurality of clients, names of the corresponding clients (e.g., "Adam", "Charlene" and "Dave"), indications of whether the respective clients support data sharing, and if data sharing is supported indications (e.g., "gleams") of whether new or updated data is available from those clients.

The representation of Adam, for instance, includes an indication illustrated as a folder which indicates that Adam supports data sharing. Further, a visual representation on the "Adam" folder is used to notify Bob 104(n) that a change has been made to data contained in that folder, which in this instance is illustrated through the overlay of a star (or "gleam") on the folder. Thus, Bob 104(n) may select the folder to cause the contents of the folder to be displayed in another sharing portion 506 of the user interface 502.

The other sharing portion 506 is illustrated as including sub-folders that are shared between Adam 104(1) and Bob 104(n), which in this instance include vacation photos 508, work project 510, documents 512, and kid's home videos 514. Thus, Bob 104(n) is notified that modifications have been made to shared data, and may investigate those changes through navigation through the representations while in an instant messaging user interface. It should be noted that the indication (e.g., a folder) that Charlene 104(N) supports data sharing does not include an indication that the data has been modified. Therefore, Bob 104(n) is kept informed as to the status of the data shared by Charlene 104(N) with Bob 104(n). It should also be noted that "Dave" does not include a sharing indication, and therefore does not support data sharing. Although exemplary instant messaging user interfaces that support data sharing have been discussed, it should be apparent that a wide variety of other user interfaces may also be utilized to support data sharing without departing from the spirit and scope thereof.

Exemplary Procedures

The following discussion describes instant messaging with data sharing that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks (e.g., FIGS. 6-8) and arrows, e.g., FIGS. 9-10. In portions of the following discussion, reference will be made to the environment 100 of FIG. 1 and/or the system 200 of FIG. 2.

Figure 6:
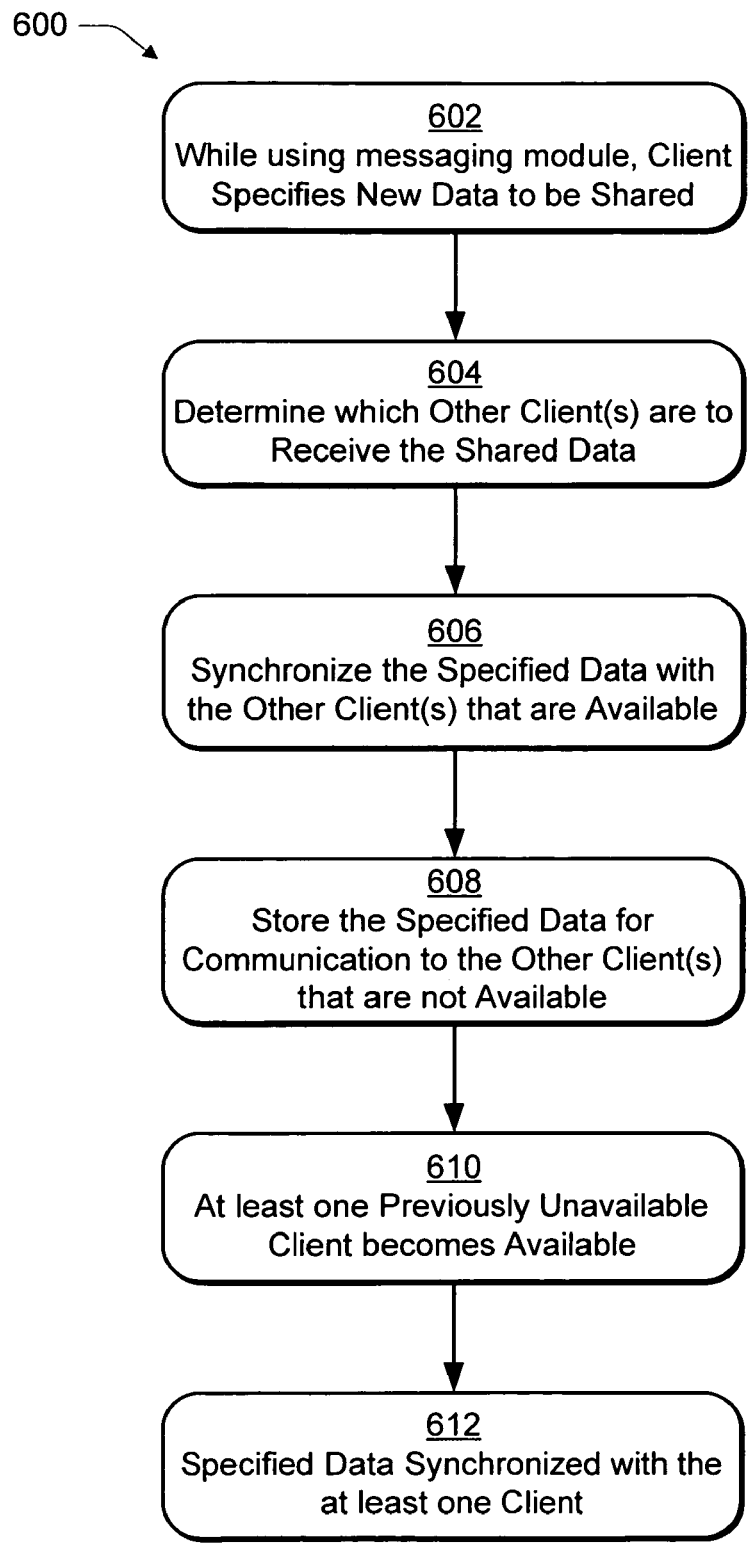
FIG. 6 is a flow diagram depicting a procedure in an exemplary implementation in which data shared in conjunction with an instant messaging session is synchronized even when one of the clients that is to share the data is unavailable.

FIG. 6 is a flow diagram depicting a procedure 600 in an exemplary implementation in which data shared in conjunction with an instant messaging session is synchronized even when one of the sharing clients that is to share the data is unavailable. While using messaging module 108(1), a client 104(1) specifies new data to be shared (block 602). For example, the client 104(1) may drag a file from their desktop to a sharing folder, e.g., folders 302, 308, 310, by using the representation of the sharing folder 404 or 506 in the sharing user interface 400 or 500, respectively.

A determination is then made as to which other client(s) are to receive the shared data (block 604). For example, the sharing module 112(1) may determine through examination of the folder that received the indication of the photo that data placed in that folder is to be shared with particular clients. The specified data is then synchronized with the other clients that are available (block 606) via instant messaging. For example, the messaging module 108(1) may determine presence of each of the particular clients and synchronize the data with those clients that are available by connecting with them via network 106 or peer-to-peer network 212. Further discussion of presence may be found in relation to FIG. 7.

The specified data is stored for communication to the other clients that are not available (block 608). For example, the data may be stored as client data 114(d) in storage 116 by connecting with messaging service 102. Therefore, when at least one previously unavailable client becomes available (block 610), the specified data is synchronized with the at least one client (block 612). Thus, the data may be specified for sharing and synchronization by a plurality of clients regardless of whether each of the clients is currently available.

Figure 7:
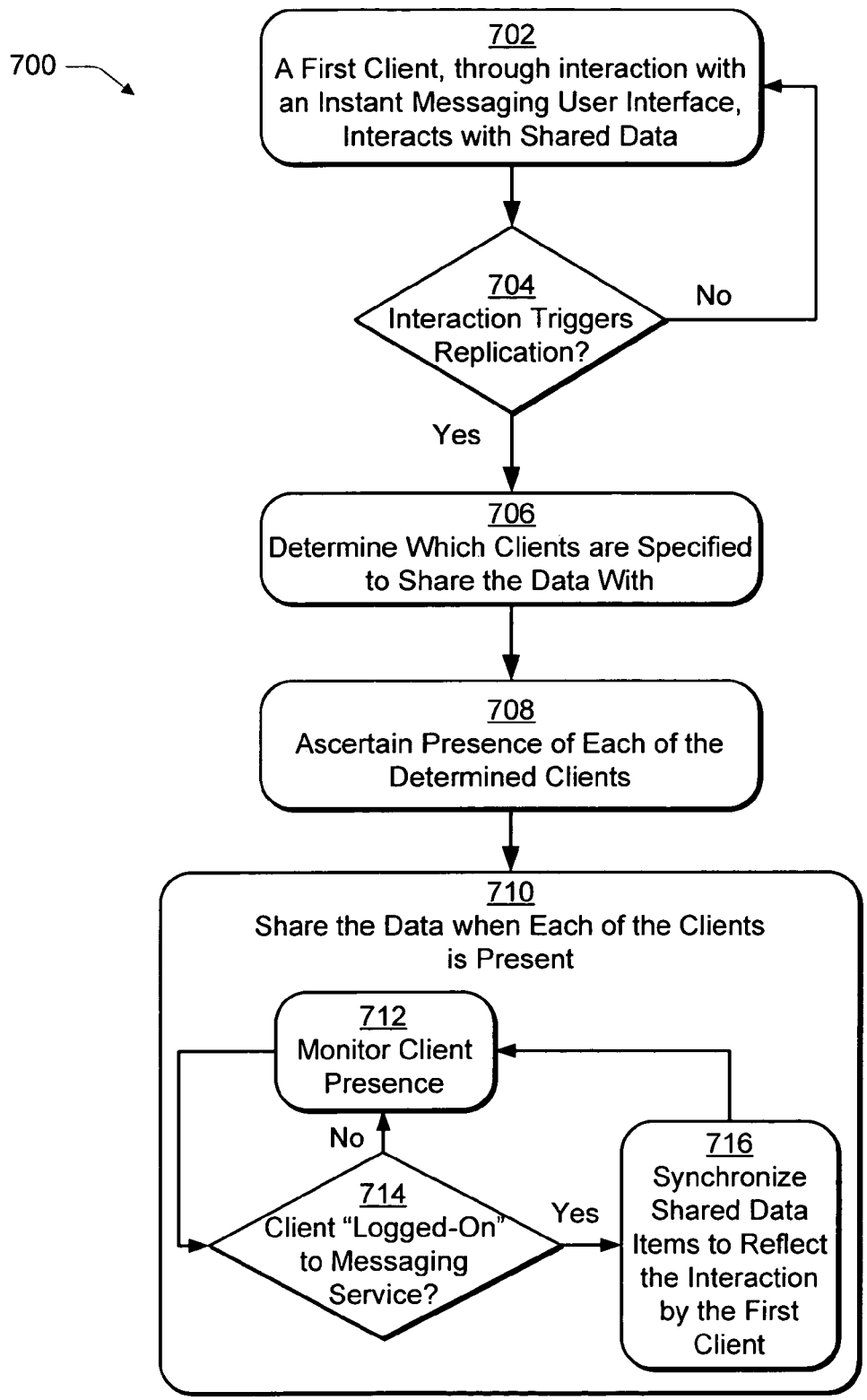
FIG. 7 is a flow diagram depicting a procedure in an exemplary implementation in which presence of clients in relation to availability for instant messaging is utilized to share data between the clients.

FIG. 7 is a flow diagram depicting a procedure 700 in an exemplary implementation in which presence of clients in relation to availability for instant messaging is utilized to share data between the clients. A first client, through interaction with an instant messaging user interface, interacts with shared data block 702). For example, the first client may add the data to a shared folder, change data already contained in the folder, delete data from the folder, and so on.

A determination is then made as to whether the interaction triggers replication (decision block 704). For example, the sharing module 112(1) may monitor interaction of the client 104(1) with the client data 220(1) to determine whether a change has been made to the client data that needs to be replicated. If not ("no" from decision block 704), the interaction (block 702) may continue to be monitored.

When the interaction triggers replication ("yes" from decision block 704), a determination is made as to which clients are specified to share the data with (block 706). For example, the data may be included in a "my sharing" folder 302, copies of which are included on client 104(n) (i.e., "Bob") as folder 314 and client 104(N) (i.e., "Charlene") as folder 324. In other examples, the data may be included in a group folder 308 specified by a persistent object, and so on.

Presence of each of the determined clients is then ascertained (block 708). For example, the messaging module 108 (1) may determine presence of each client 104(1)-104(N) in relation to available for instant messaging, such as whether the clients are "online", "offline", "online but not receiving instant messages", and so on. Thus, the sharing of data may leverage the notion of presence provided via instant messaging.

The data is then shared with each of the clients when the clients are present (block 710). This may be performed in a variety of ways. For instance, client presence may be monitored (block 712) through interaction of the sharing module 112(1) with the messaging module 108(1). A determination is then made as to whether the client is "logged-on" to a messaging service (decision block 714). For example, the messaging module 108(1) may communicate with the messaging manager module 110 to determine which of the plurality of clients 104(n)-104(N) are currently logged on. If the client is logged-on ("yes" from decision block 714), the shared data item is synchronized to reflect the interaction by the first client (block 716). When the client is not logged-on ("no" from decision block 714), the client presence is again monitored (block 712). Thus, in this implementation the data shared by the clients is synchronized as the clients become available. In another implementation, however, data synchronization is scheduled, an example of which may be found in relation to the following figure.

Figure 8:
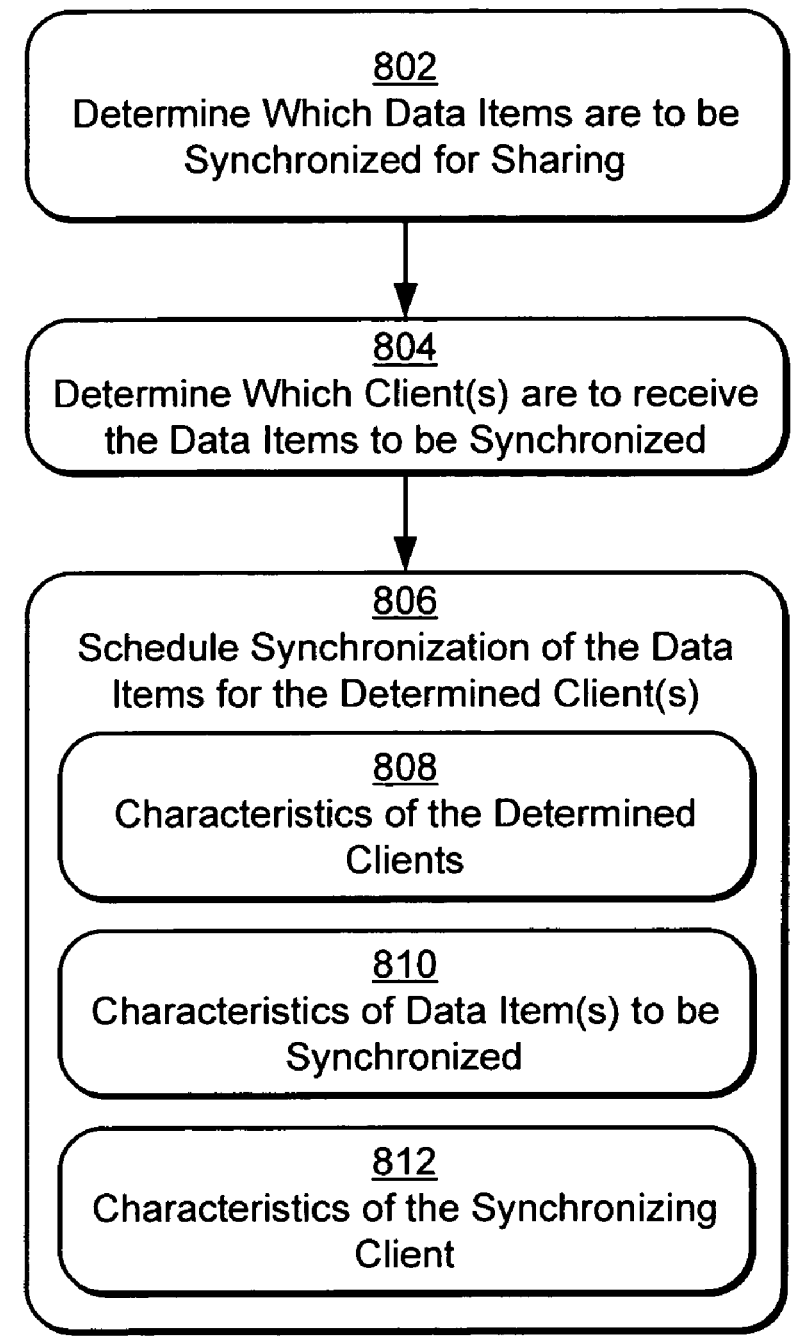
FIG. 8 is a flow diagram depicting a procedure in an exemplary implementation in which synchronization of data shared in conjunction with instant messaging is scheduled.

FIG. 8 is a flow diagram depicting a procedure 800 in an exemplary implementation in which synchronization of data shared in conjunction with instant messaging is scheduled. A determination is made as to which data items are to be synchronized for sharing (block 802). For example, the sharing module 112(1), when executed, may monitor interaction by the client with data items specified to be shared with at least one other client.

A determination is then made as to which client(s) are to receive the data items to be synchronized (block 804). For example, the client may interact with a plurality of different data items and the sharing module 112(1) may determine which clients share which of the data items, such as through different folders specified for sharing with different clients.

Synchronization of the data items for the determined client (s) is then scheduled (block 806). The scheduling may be based on a variety of characteristics. For example, the characteristics of the determined clients (block 808) may be utilized to schedule synchronization of the data items. For instance, the characteristics may include whether the determined clients are currently logged on to a messaging service, data which describes historical presence trends of the client (e.g., client "x" is typically available for "y" period of time), hardware and/or software resources of the client (e.g., connection speed and amount of time needed by the client to receive the data), and so on.

In another example, the characteristics of the data items to be synchronized (block 810) are utilized, such as size, priority in relation to other data items, and so forth. In a further example, the characteristics of the synchronizing client (block 812) are utilized, such as memory cycles, network bandwidth of the client to send the data, and so forth. In this way, a variety of characteristics may be utilized to schedule synchronization. Although a few examples have been discussed, it should be apparent that a variety of other examples are also contemplated without departing from the spirit and scope thereof.

Version Vectors

As previously shown in FIGS. 3-5, shared spaces may be represented in user interfaces as folders. The contents of these folders may be synchronized between clients regardless of whether the clients are online at the same time. Thus, in the case of a space shared between two clients, this may mean that eventually (i.e., when the synchronization is complete) both clients will have an identical set of data (e.g., files and sub-folders) in their sharing folder. In the case of a space synchronized between all the members of a group (e.g., a group formed using a persistent object 216(a)), this may mean that eventually each the members of the group or circle will have an identical set of data in their sharing folder.

Data synchronization may be achieved in many ways. For instance, a multi-master state-based file replication technique may be employed by the replication modules to synchronize data. This technique involves computation of a global state, called a "version vector", for each replica, or copy of the folder that is to be synchronized. By comparing two version vectors, for instance, the replication modules may determine whether two copies are to be synchronized. If the version vectors are identical, the copies are considered synchronized. If the version vectors differ, however, the replication modules may use the difference in the version vectors to efficiently determine what data items (e.g., files or folders) are to be synchronized.

The version vector may contain a number of entries equal to a number of different copies that are to be synchronized. This may be advantageous since that number will in general be much smaller than the number of data items that are to be kept synchronized. For instance, for a space shared between two clients Adam 104(1) and Bob 104(n), the number of copies would typically be two, one for each client, while there may be tens of thousands of files in the shared space. For instance, the following shows an example of possible version vectors for the two copies, with the two copies on client 104(1) and 104(n) being denoted by "A" and "B", respectively:

Version vector of copy A: $\{\rightarrow 15, B \rightarrow 300\}$

Version vector of copy B: $\{\rightarrow 12, B \rightarrow 500\}$

However, note that even for the case of a space shared between two clients there could be more than two copies involved. For instance, consider the case where client Adam 104(1) interacts with the messaging service 102 using two different machines, "$M_{A1}$" and "$M_{A2}$", and client Bob 104(n) interacts with the messaging service 102 using a single machine "$M_B$." In this case, there are three copies of the data (on $M_{A1}$, $M_{A2}$, and $M_B$, respectively) and thus the version vectors would contain three entries each, an example of which is as follows:

Version vector of copy A on $M_{A1}$: $\{M_{A1} \rightarrow 18, M_{A2} \rightarrow 33, M_B \rightarrow 300\}$ Version vector of copy A on $M_{A2}$: $\{M_{A1} \rightarrow 13, M_{A2} \rightarrow 58, M_B \rightarrow 300\}$ Version vector of copy B on $M_B$: $\{M_{A1} \rightarrow 11, M_{A2} \rightarrow 10, M_B \rightarrow 777\}$ While the problem of efficient synchronization between two machines may be addressed via version vectors, techniques are still desired to efficiently determine which machines are to be synchronized. For instance, client "Adam" may have 100 contacts 218(1) and maintain shared spaces with each of those contacts. Therefore, when Adam 104(1) comes online, a brute-force approach may require that Adam's messaging module 108(1) connect to all 100 contacts to exchange version vectors and determine whether synchronization is desired, which may result in inefficient use of resources. Accordingly, a variety of techniques may be employed to provide for efficient synchronization of shared data, examples of which are found in relation to the following figures.

Since both embodiments rely on version vector comparisons for equality, the version vectors may be further optimized to store and transmit less data by using a compact representation of the version vectors instead of the full vectors themselves. One way to achieve such a compact representation is to compute a hash from the canonical representation of the vector. While any hash algorithm may be used, a cryptographically secure one (such as MD5 or SHA-1) reduces the risk of collisions, i.e., equal hashes for different version vectors. In the descriptions below, the term "version vector" is used to mean either the full vector or a compact representation of the vector interchangeably.

Figure 9:
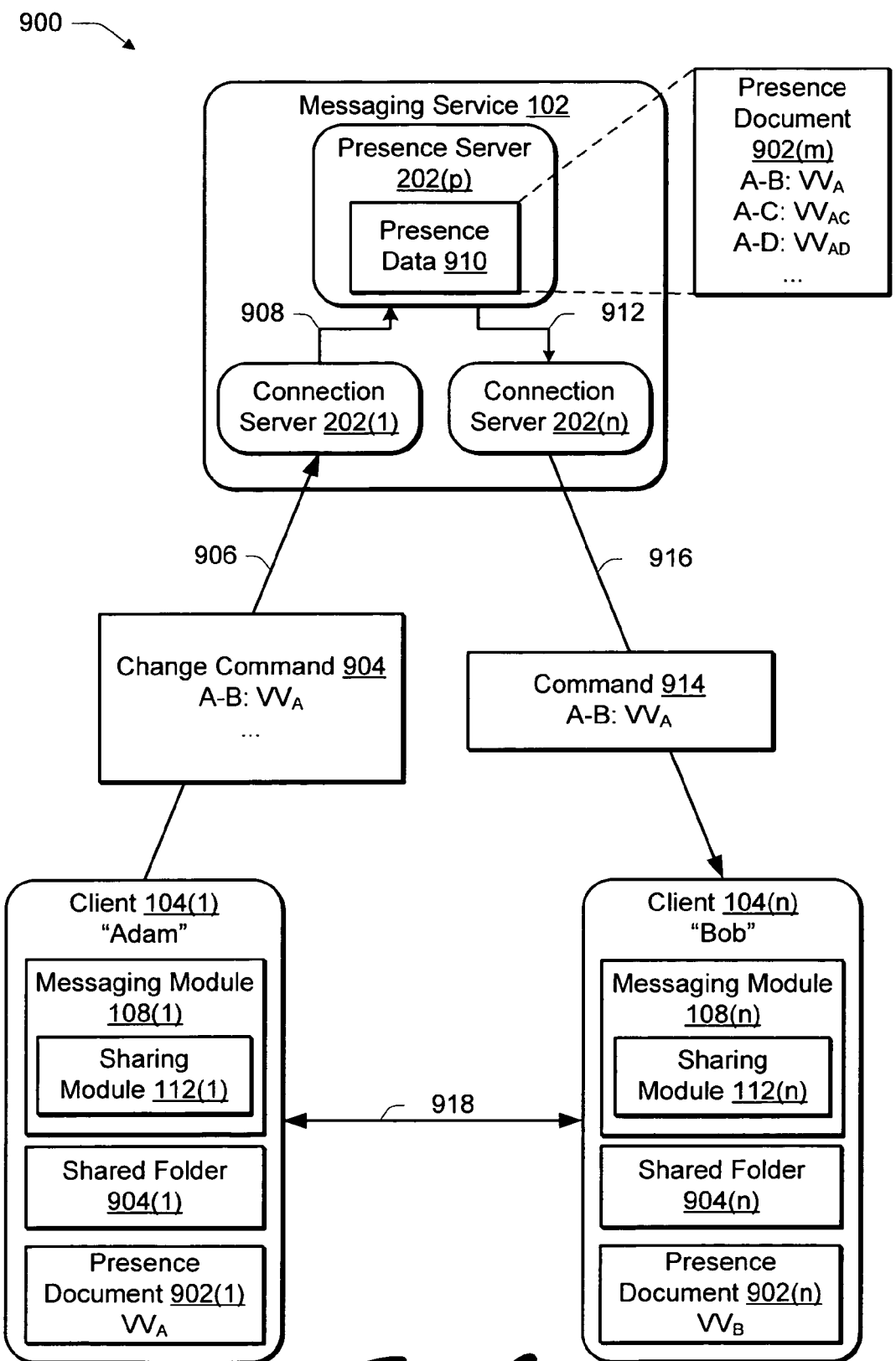
FIG. 9 is an illustration in an exemplary implementation in which version vectors are published in a presence document to specify data to be shared in conjunction with instant messaging.

FIG. 9 is an illustration in an exemplary implementation 900 in which version vectors are published in a presence document to specify data to be shared in conjunction with instant messaging. This technique is based on each client 104(1), 104(n) publishing each of its version vectors as part of respective presence documents 902(1), 902(n). Up-to-date copies 902(m) of these presence documents are maintained by the messenging service 102 as long as the clients 104(1), 104(n) are signed on. These presence documents 902(m) may be updated each time one of the clients 104(1), 104(n) logs onto the messaging service 102, each time one of the version vectors maintained by the respective client 104(1), 104(n) changes, and so on.

For example, Adam 104(1) has a shared space with Bob 104(n). Each client 104(1), 104(n) maintains a respective copy of a shared folder 904(1), 904(n) a respective version vector, illustrated as "$VV_A$" and "$VV_B$" respectively in the respective presence documents 902(1), 902(n). The following procedure is then performed to determine whether the two folders are to be synchronized, and if so, synchronization is performed.

Whenever client 104(1) signs onto the messaging service 102 (and/or whenever one of its version vectors "$VV_A$" changes), client 104(1) notifies the messaging service 102 of its presence information change by sending a change (CHG) command 904 (arrow 906). The information sent as part of the CHG command is augmented with information about each of the client's 104(1) version vectors as obtained from its presence document 902(1). A connection server 202(1) to which client 104(1) is connected routes this information on to the client's presence server 202(p) (arrow 908). The presence server 202(p) updates presence data 910 (which in this instance is configured as the presence document 902(m)) for client 104(1) to reflect the client's friendly name, status code, and so on. Additionally, the present server 202(p) stores information about each of the client's 104(1) version vectors.

Because client 104(n) has client 104(1) on its list of contacts 218(n), whenever client 104(1) has a change in presence, the messaging service 102 sends client 104(n) (through a corresponding connection server 202(n) as illustrated by arrow 916) a command 914 having the new information. The command 914 include a version vector information from client 104(1) as obtained from the presence data 910 for any spaces shared by the clients 104(1), 104(n). In an implementation, the presence server 202(p) may filter out information regarding the other version vectors of client 104(1) thereby conserving resources and preserving privacy of client 104(1).

Upon receipt of the command 914, client 104(n) compares the received version vector "$VV_A$" with its own version vector "$VV_B$". If the vectors match, then the shared folders 904(1), 904(n) are synchronized. If the vectors do not match, however, then synchronization of the shared folders 904(1), 904(n) is performed via connection over the network 106 or peer overlay 212.

Client 104(n), for instance, may contact client 104(1) and execute a protocol to synchronize the shared folders 904(1), 904(n) (arrow 918). This protocol may include exchange of the full version vectors if a compact representation was used previously to determine whether synchronization was needed. Following completion of that protocol, each client updates its version vector and updates the respective presence documents 902(1), 902(n) with the new values.

Figure 10:
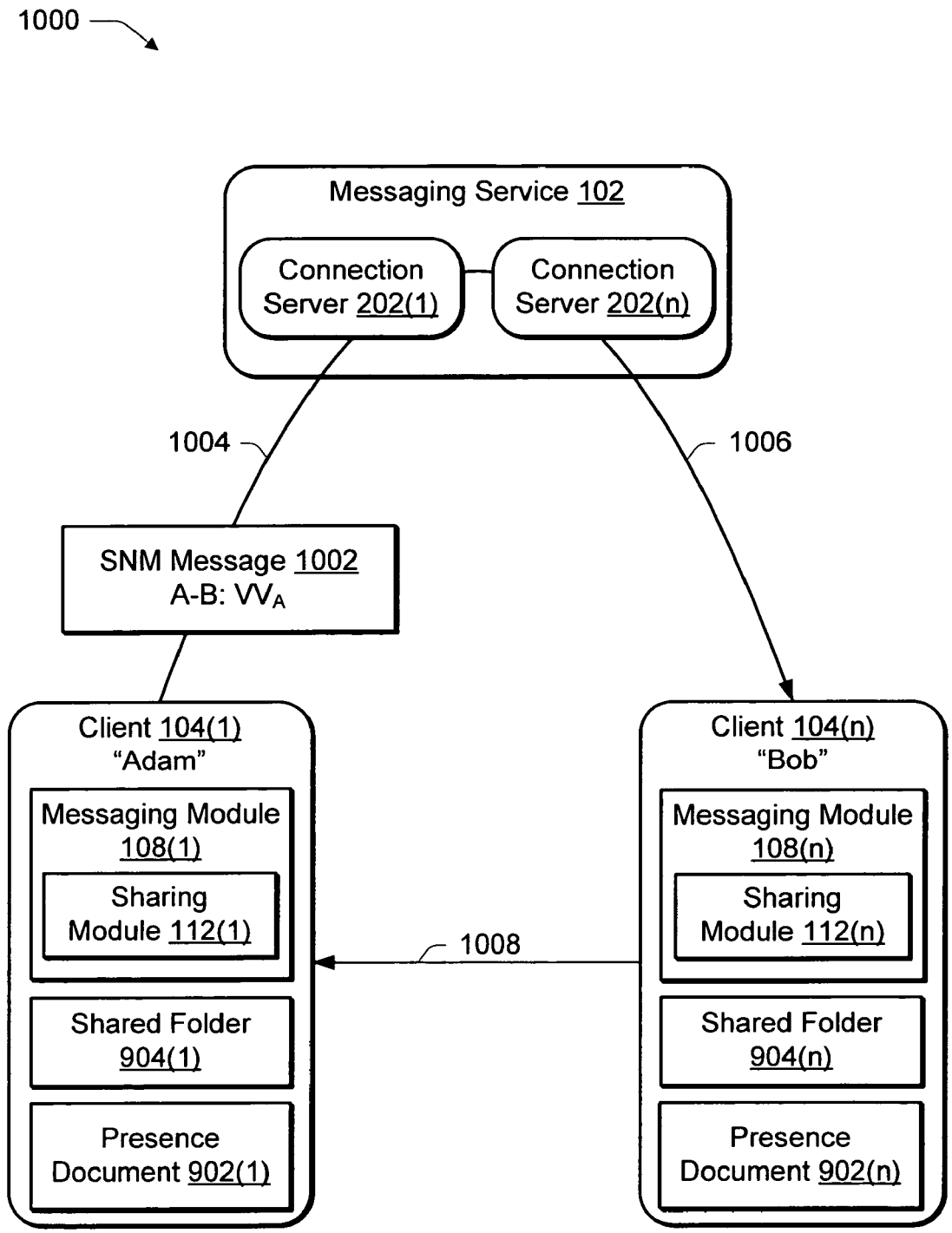
FIG. 10 is an illustration in an exemplary implementation in which synchronization negotiation messages are utilized to trigger replication of shared data between clients.

FIG. 10 is an illustration in an exemplary implementation 1000 in which synchronization negotiation messages (SNMs) are utilized to trigger replication of shared data between clients. In this technique, the clients 104(1), 104(n) use regular presence notifications from the messaging service 102 to decide when to send SNMs to other clients. The SNMs contain version vectors for folders that may utilize synchronization. This technique does not utilize additional storage on a presence server and uses a minimal amount of bandwidth.

This technique is based on a new messaging protocol primitive called a synchronization negotiation message (SNM) 1002 that may be used for reliable, unidirectional communication between the clients 104(1), 104(n). The SNM message contains a destination instant messaging handle that identifies the intended recipient (e.g., client 104(n)), and a payload containing a version vector and an identifier for a shared space.

First, client 104(1), through execution of the messaging module 108(1) and its corresponding sharing module 112(1), determines that at least one condition has been met to send the SNM message 1002 (arrow 1004) to contact client 104(n). A variety of conditions may be utilized. For example, one of the client's 104(1) version vectors may have changed (e.g., as a result of a local change to the shared files, a completed synchronization, and so on) and at least one of its contacts (e.g., client 104(n)) for that sharing relationship is online. In another example, one of its contacts (e.g., client 104(n)) with which it has a sharing relationship comes online. It should be noted that this may be optimized by caching a last known version vector for that particular contact (e.g., client 104(n)) on a per-machine basis and sending the SNM message 1002 if client's 104(1) current version vector is different from the cached one for contact, e.g., client 104(n).

The sent SNM message 1002 is routed by the messaging service 102 (and more particularly the connection servers 202(1), 202(n)) to client 104(n) (arrow 1006). Upon receipt of the SNM message 1002, client 104(n) compares the received version vector "$VV_A$" with its own version vector "$VV_B$". If the version vectors match, then we know that the shared folders 904(1), 904(n) are synchronized.

If the version vectors differ, client 104(n) contacts client 104(1) via the network 106 or peer-to-peer overlay 212 and executes a protocol to synchronize the folders 904(1), 904(n) (arrow 1008). As before, this protocol may include exchange of the full version vectors if a compact representation was used to determine whether synchronization was desired. Following completion of the protocol, each client 104(1), 104(n) updates its respective version vector.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
during an instant messaging session:
establishing, by a client device, a shared space accessible by the client device and one or more other client devices;
specifying data by the client device to be shared with the one or more other client devices, wherein at least one said other client device is not available during the instant messaging session;
storing the data in a local storage or in a storage that is not included in the client device and the one or more other client devices;
synchronizing the shared data with each said other client device when the client device is available, wherein synchronizing the shared data with each said other client device includes communicating a message, the message comprising a version vector that contains at least one entry that identifies an item in the shared data, from the client device to each said other client device when each said other client device is available, the version vector utilized to trigger replicating shared data that is modified when the version vector from the client device differs from a version vector maintained by at least one said other client device, and updating the shared data to a current status based on each entry that differs between the version vector from the client device and the version vector maintained by the at least one said other client device, the updating facilitated by the at least one said other client device contacting the client device and executing a synchronization protocol;
detecting when a conflicting change is made to the item in the shared data, wherein when the conflicting change is detected:
flagging the item in the shared data as conflicting; and
notifying at least one client device of the conflict for correction; and
providing the updated shared data stored in the local storage or the storage not included in the client device and the one or more other client devices to the at least one said other client device.

2. A method as described in claim 1, wherein the synchronizing is performed over a peer-to-peer network.

3. A method as described in claim 1, where the specifying is performed via a user interface that is configured to display instant messages communicated during the instant messaging session.

4. A method as described in claim 1, wherein the specifying is performed via a user interface that includes a representation of a folder which corresponds to data shared with the one or more other client devices.

5. A method as described in claim 1, wherein the storage is accessible via a web interface.

6. A method as described in claim 1, wherein:
the specifying is performed via a user interface that includes a representation of a folder which corresponds to data shared by a group having a plurality of other said client devices; and
membership in the group is specified by a persistent object that is configured to survive past termination of the instant messaging session.

7. A method as described in claim 1, wherein the data is a subset of a data item that describes one or more changes made to the data item.

8. A method as described in claim 1, further comprising scheduling the synchronization of the data.

9. A method, using instant messaging client devices that incorporate data sharing, for a first client device to collaboratively share data between one or more of a plurality of other client devices, the method comprising:
determining, by the first client device, whether the data to be shared by the one or more plurality of other client devices is to be synchronized;

selecting, by the first client device, which of the one or more of the plurality of other client devices will receive the data to be shared;

specifying, by the first client, a shared space that facilitates access to the data to be shared by the selected other client devices;

specifying, by the first client device, that the selected other client devices can collaboratively modify the data; and based on the determining, scheduling synchronization of the data to be shared while at least one of the selected other client devices is not available via the instant messaging, wherein synchronization of the data includes communicating a message from the first client device to each selected other client device when each selected other client device is available, the message comprising a version vector that contains at least one entry that identifies an item in the data to be shared, the version vector utilized to trigger replicating the data that is modified when the version vector from the first client device differs from a version vector maintained by at least one of the selected other client devices, and updating the data to be shared to current status by using each entry that differs between the version vector from the first client device and the version vector maintained by the at least one of the selected other client devices;

detecting when a conflicting change has been made to the item in the data to be shared, wherein when the conflicting change is detected:

flagging the item in the data to be shared as conflicting; and notifying at least one of the selected other client device of the conflict for correction; and providing the updated data to the at least one of the selected other client devices according to the decided upon schedule.

10. A method as described in claim 9, wherein the determining is based at least in part on monitoring interaction with a user interface configured to display instant messages.

11. A method as described in claim 9, further comprising determining presence of one or more said client devices and wherein the scheduling is performed based at least in part on the determined presence.

12. A method as described in claim 9, wherein the determining is based at least in part on the message being a synchronization negotiation message having the version vector that corresponds to the data to be shared.

13. A method as described in claim 9, wherein the determining is performed based at least in part by utilizing version vectors which are stored as part of presence information that describes the one or more of the plurality of other client devices.

14. A method as described in claim 9, wherein the scheduling is based at least in part on one or more current characteristics of at least one selected other client device that is to receive the data to be shared.

15. A method as described in claim 9, wherein the scheduling is based at least in part on one or more characteristics of at least one said client device that originates the data to be shared.

16. A method as described in claim 9, wherein the scheduling is based at least in part on one or more characteristics of the data to be synchronized.

17. A method as described in claim 9, wherein the scheduling the synchronization of the data is facilitated by a scheduling module executing within the client device and each said other client device.

18. One or more computer-readable media comprising computer executable instructions that, when executed, direct a computer to perform a method, the method comprising:

determining whether to synchronize data specified to be shared with at least one other client during instant messaging; and based on the determination, scheduling when to synchronize the data with the at least one other client, wherein synchronizing the data with the at least one other client includes communicating a message to the at least one other client when the at least one other client is available, the message comprising a version vector that contains at least one entry that identifies an item in the data specified to be shared, the message utilized to trigger replicating data specified to be shared when the version vector from the computer differs from a version vector maintained by the at least one other client, and updating the data specified to be shared to current status based on each item identified by each entry that differs between the version vector from the computer and the version vector maintained by the at least one other client;

detecting when a conflicting change has been made to the item in the data to be shared, wherein when the conflicting change is detected:

flagging the item in the data specified to be shared as conflicting; and notifying at least one client of the conflict for correction; and providing the updated data specified to be shared to the at least one other client according to the decided upon schedule.

19. The method as described in claim 18, wherein the computer executable instructions direct the computer to output a user interface configured to display instant messages and accept an input to be communicated as an instant message during an instant messaging session.

20. The method as described in claim 18, wherein the computer executable instructions direct the computer to schedule utilizing characteristics that are based on the at least one other client, the data, and the computer.

* * * * *